(12) United States Patent  
Zhang

(10) Patent No.: US 12,035,311 B2  
(45) Date of Patent: Jul. 9, 2024

(54) FEEDBACK INFORMATION SENDING METHOD AND APPARATUS

(71) Applicant: Huawei Technologies Co., Ltd., Shenzhen (CN)

(72) Inventor: Xingwei Zhang, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 17/403,551

(22) Filed: Aug. 16, 2021

(65) Prior Publication Data

US 2021/0377931 A1     Dec. 2, 2021

Related U.S. Application Data

(63) Continuation of application No. PCT/CN2020/073529, filed on Jan. 21, 2020.

(30) Foreign Application Priority Data

Feb. 15, 2019    (CN) .......................... 201910117752.9

(51) Int. Cl.  
    *H04W 72/20*     (2023.01)  
    *H04B 7/06*     (2006.01)  
    *H04L 5/00*     (2006.01)

(52) U.S. Cl.  
    CPC .......... *H04W 72/20* (2023.01); *H04B 7/0626* (2013.01); *H04L 5/0048* (2013.01)

(58) Field of Classification Search  
    CPC ..... H04W 72/20; H04L 5/0048; H04B 7/0626  
(Continued)

(56) References Cited

U.S. PATENT DOCUMENTS

| | | | | |
|---|---|---|---|---|
| 2019/0110325 | A1* | 4/2019 | Gulati | .................. H04L 5/0053 |
| 2020/0022089 | A1* | 1/2020 | Guo | ...................... H04W 24/08 |
| 2021/0345313 | A1* | 11/2021 | Basu Mallick | ....... H04L 1/1825 |

FOREIGN PATENT DOCUMENTS

| | | |
|---|---|---|
| CN | 101877884 A | 11/2010 |
| CN | 102480347 A | 5/2012 |

(Continued)

OTHER PUBLICATIONS

3GPP TSG RAN WG1 #95 R1-1813553 (Year: 201).*

(Continued)

*Primary Examiner* — William Nealon  
(74) *Attorney, Agent, or Firm* — Leydig, Voit & Mayer, Ltd.

(57) ABSTRACT

A feedback information sending method and an apparatus are provided. A first communications apparatus may determine sidelink feedback information, and send a reference signal to a second communications apparatus, where the reference signal carries the sidelink feedback information. In this way, terminals can send and receive the sidelink feedback information by using the reference signal, to improve transmission efficiency of the sidelink feedback information. When the terminal needs to send both a control channel or a data channel and feedback information in a same slot, this method avoids a problem that the terminal needs to simultaneously send two channels, e.g., the control channel (or the data channel) and a feedback channel, avoids reducing original transmission efficiency of the control channel or the data channel, and implements compatibility between sending through the control channel (or the data channel) and feedback through the feedback channel.

20 Claims, 4 Drawing Sheets

(58) Field of Classification Search
USPC .......................................................... 370/329
See application file for complete search history.

(56) References Cited

FOREIGN PATENT DOCUMENTS

| CN | 103427962 | A | 12/2013 |
|---|---|---|---|
| CN | 106797635 | A | 5/2017 |
| CN | 107733609 | A | 2/2018 |
| CN | 107995605 | A | 5/2018 |
| CN | 108400843 | A | 8/2018 |
| CN | 109196888 | A | 1/2019 |
| WO | 2016116006 | A1 | 7/2016 |
| WO | 201812689 | A1 | 11/2018 |
| WO | 2018203407 | A1 | 11/2018 |

OTHER PUBLICATIONS

3GPP TSG RAN WG1 #95 R1-1812207 (Year: 2018).*
3GPP TSG RAN WG1 #95 R1-1812879 (Year: 2018).*
3GPP TSG RAN WG1 #95 R1-1812984 (Year: 2018).*
3GPP TSG RAN WG1 #95 R1-1813227 (Year: 2018).*
3GPP TSG RAN WG1 #94bis R1-1810807 (Year: 2018).*

Samsung, "Discussion on physical layer structures for NR V2X," 3GPP TSG RAN WG1 #95, Spokane, USA, R1-1812984, total 10 pages, 3rd Generation Partnership Project, Valbonne, France (Nov. 12-16, 2018).
Huawei, HiSilicon, "Sidelink physical layer structure for NR V2X," 3GPP TSG RAN WG1 Meeting #95, Spokane, USA, R1-1812206, total 12 pages, 3rd Generation Partnership Project, Valbonne, France (Nov. 12-16, 2018).
Intel Corporation, "Remaining details on UE processing times and HARQ operation," 3GPP TSG RAN WG1 Meeting #92, Athens, Greece, R1-1803265, total 12 pages, 3rd Generation Partnership Project, Valbonne, France (Feb. 26-Mar. 2, 2018).
Ntt Docomo, Inc., "Sidelink physical layer procedure," 3GPP TSG RAN WG1 Meeting #95, Spokane, USA, R1-1813318, total 5 pages, 3rd Generation Partnership Project, Valbonne, France (Nov. 12-16, 2018).
InterDigital Inc., "On Physical Layer Procedures," 3GPP TSG RAN WG1 Meeting #95, Spokane, USA, R1-1813227, XP051479514, total 5 pages, 3rd Generation Partnership Project, Valbonne, France (Nov. 12-16, 2018).
NEC, "Support of unicast, groupcast and broadcast in NR V2X," 3GPP TSG RAN WG1 Meeting #94bis, Chengdu, China, R1-1810807, XP051518212, total 4 pages, 3rd Generation Partnership Project, Valbonne, France (Oct. 8-12, 2018).

* cited by examiner

FEEDBACK INFORMATION SENDING METHOD AND APPARATUS

CROSS-REFERENCE TO RELATED APPLICATIONS

This application is a continuation of International Application No. PCT/CN2020/073529, filed on Jan. 21, 2020, which claims priority to Chinese Patent Application No. 201910117752.9, filed on Feb. 15, 2019. The disclosures of the aforementioned applications are hereby incorporated by reference in their entireties.

TECHNICAL FIELD

Embodiments of this application relate to the field of mobile communications technologies, and in particular, to a feedback information sending method and an apparatus.

BACKGROUND

In 5th generation mobile communication technology (5G) new radio (NR), a physical sidelink feedback channel (PSFCH) is introduced to transmit feedback information in sidelink transmission.

When a terminal needs to send feedback information through both a control channel or a data channel and a PSFCH in a same slot, if a current 4th generation mobile communication technology (4G) feedback mechanism is used, the terminal needs to send the feedback information through the control channel or the data channel, and no longer needs to send the feedback information through the PSFCH. However, because the feedback information occupies the control channel or the data channel, puncturing or rate matching needs to be performed on one or more bit(s) transmitted on the control channel or the data channel. Therefore, original transmission efficiency of the control channel or the data channel is affected, and transmission and feedback are incompatible.

SUMMARY

This application provides a feedback information sending method and an apparatus, to resolve a technical problem of incompatibility between sending through a control channel (or a data channel) and feedback through a PSFCH.

According to a first aspect, this application provides a feedback information sending method. The method may be performed by a first communications apparatus. According to the method, the first communications apparatus may determine sidelink feedback information, and the first communications apparatus may further send a reference signal to a second communications apparatus, where the reference signal carries the sidelink feedback information.

According to the foregoing design, terminals can send and determine the sidelink feedback information by using the reference signal, to improve transmission efficiency of the sidelink feedback information. When the terminal needs to send feedback information through both a control channel or a data channel and a PSFCH in a same slot, the terminal may use the reference signal to carry the feedback information, and no longer needs to send the feedback information through the control channel or the data channel. Therefore, this can avoid a puncturing operation or a rate matching operation performed on the control channel or the data channel when the feedback information is sent through the control channel or the data channel, avoid reducing original transmission efficiency of the control channel or the data channel, and implement compatibility between sending through the control channel (or the data channel) and feedback through the PSFCH.

In a possible design, the reference signal may carry some or all of the sidelink feedback information. Specifically, the sidelink feedback information may include at least one of the following information: a receiving response, channel state information, or a scheduling request. The reference signal may be used to carry the at least one of the receiving response, the channel state information, or the scheduling request. The receiving response includes an acknowledgement, a negative acknowledgement, or discontinuous transmission. The channel state information includes at least one of the following information: a channel quality indicator CQI, a precoding matrix indicator PMI, a rank indicator RI, reference signal received power RSRP, reference signal received quality RSRQ, a path loss, a sounding reference signal SRS resource indicator SRI, a channel state information reference signal CSI-RS resource indicator CRI, a received signal strength indicator RSSI, a precoding type indicator PTI, a moving direction of a vehicle, or an interference condition.

In a possible design, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal (the bandwidth of the reference signal may be represented by a quantity of RBs), an RB number of the reference signal, a type of the reference signal, or a type of a channel to which the reference signal belongs. According to this design, efficiency of indicating the sidelink feedback information can be improved.

In a possible design, the first communications apparatus sends the reference signal to the second communications apparatus if the first communications apparatus determines that at least one of the following conditions is met: the sidelink feedback information includes a receiving response; the sidelink feedback information does not include channel state information, but includes only a receiving response or includes a receiving response and a scheduling request; a length of the sidelink feedback information is not greater than a first length, where the first length may be a preset length, for example, n bits, where n is a positive integer, or the first degree may be a threshold configured by a base station; the reference signal is a reference signal on a physical sidelink control channel PSCCH; the reference signal is a reference signal on a physical uplink control channel PUCCH; the reference signal is a reference signal on a physical sidelink shared channel PSSCH; or the reference signal is a reference signal on a physical uplink shared channel PUSCH. According to this design, impact of indicating the sidelink feedback information on data channel transmission can be further avoided.

In addition, the first communications apparatus sends the reference signal to the second communications apparatus if the first communications apparatus determines that at least one of the following conditions is met: the first symbol occupied by the reference signal is not later than sending timing for sending the sidelink feedback information; or the last symbol occupied by the reference signal is not later than sending timing for sending the sidelink feedback information. To be specific, if the first symbol occupied by the reference signal is later than the sending timing for sending the sidelink feedback information, and the sidelink feedback information is still carried by using the reference signal, the sidelink feedback information may not be fed back in a timely manner; or if the last symbol occupied by the reference signal is later than the sending timing for sending the sidelink feedback information, and the sidelink feedback information is still carried by using the reference signal, the sidelink feedback information is not fed back in a timely manner. According to this design, timely feedback of the sidelink feedback information can be further ensured.

The first communications apparatus may further send the reference signal to the second communications apparatus after determining that at least one of the following conditions is met: the first symbol occupied by the reference signal is not earlier than a preparation time for sending the sidelink feedback information, where the preparation time includes a latency of processing the sidelink feedback information by the first terminal apparatus; or the last symbol occupied by the reference signal is not earlier than a preparation time for sending the sidelink feedback information. To be specific, if the first symbol occupied by the reference signal is earlier than the preparation time for sending the sidelink feedback information, when sending the reference signal, the first terminal apparatus may have not determined all content of the sidelink feedback information that needs to be sent, and consequently cannot feed back the sidelink feedback information; or if the last symbol of the reference signal is earlier than the sending timing for sending the sidelink feedback information, when sending the reference signal, the first terminal apparatus may have not determined all content of the sidelink feedback information that needs to be sent, and consequently cannot feed back the sidelink feedback information. According to this design, a success rate and accuracy of feeding back the sidelink feedback information can be further improved.

It should be understood that the first communications apparatus may further send the reference signal to the second communications apparatus after determining that some or all of the foregoing conditions are met.

In a possible design, the reference signal is a reference signal on a control channel, or the reference signal is a reference signal on a data channel.

In a possible design, the method further includes: The first communications apparatus sends indication information to the second communications apparatus, where the indication information is used to indicate a type of the sidelink feedback information carried by using the reference signal; the indication information is used to indicate that the sidelink feedback information is carried by using the reference signal; or if the reference signal is the reference signal on the data channel, the indication information is used to indicate that the sidelink feedback information is carried by using the data channel and the reference signal.

In a possible design, a sending resource allocated to the sidelink feedback information completely or partially overlaps with a sending resource of the control channel in time domain. Alternatively, a sending resource allocated to the sidelink feedback information completely or partially overlaps with a sending resource of the data channel in time domain.

In addition, the method may also be performed by a second communications apparatus. According to the method, the second communications apparatus may receive a reference signal from a first communications apparatus, where the reference signal carries the sidelink feedback information. The second communications apparatus may further determine the sidelink feedback information based on the reference signal.

In a possible design, the reference signal may carry some or all of the sidelink feedback information. Specifically, the sidelink feedback information may include at least one of the following information: a receiving response, channel state information, or a scheduling request. The reference signal may carry the at least one of the receiving response, the channel state information, or the scheduling request The receiving response includes an acknowledgement, a negative acknowledgement, or discontinuous transmission. The channel state information includes at least one of the following information: a channel quality indicator CQI, a precoding matrix indicator PMI, a rank indicator RI, reference signal received power RSRP, reference signal received quality RSRQ, a path loss, a sounding reference signal SRS resource indicator SRI, a channel state information reference signal CSI-RS resource indicator CRI, a received signal strength indicator RSSI, a precoding type indicator PTI, a moving direction of a vehicle, or an interference condition.

In a possible design, when the reference signal carries the sidelink feedback information, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal (the bandwidth of the reference signal may be represented by a quantity of RBs), an RB number of the reference signal, a type of the reference signal, or a type of a channel to which the reference signal belongs. According to this design, efficiency of indicating the sidelink feedback information can be improved.

In a possible design, the reference signal is a reference signal on a control channel, or the reference signal is a reference signal on a data channel.

In a possible design, the method further includes: The second communications apparatus receives indication information from the first communications apparatus, where the indication information is used to indicate a type of the sidelink feedback information carried by using the reference signal; the indication information is used to indicate that the sidelink feedback information is carried by using the reference signal; or if the reference signal is the reference signal on the data channel, the indication information is used to indicate that the sidelink feedback information is carried by using the data channel and the reference signal.

In a possible design, a sending resource allocated to the sidelink feedback information completely or partially overlaps with a sending resource of the control channel in time domain. Alternatively, a sending resource allocated to the sidelink feedback information completely or partially overlaps with a sending resource of the data channel in time domain.

According to a second aspect, this application provides another feedback information sending method. If a first communications apparatus performs the method, the first communications apparatus may determine that a second condition is met, and then the first communications apparatus may send sidelink feedback information on a first channel, where the second condition includes at least one of the following conditions: the first symbol occupied by the first channel is not later than sending timing for sending the sidelink feedback information, to avoid a problem that the sidelink feedback information is not fed back in a timely manner because the first communications apparatus still sends the sidelink feedback information through the first channel when the first symbol occupied by the first channel is later than the sending timing of the link feedback information; or the last symbol occupied by the first channel is not later than sending timing for sending the sidelink feedback information, to avoid a problem that the sidelink feedback information is not fed back in a timely manner because the first communications apparatus still sends the sidelink feedback information through the first channel when the last symbol occupied by the first channel is later than the sending timing of the link feedback information. According to this design, timely feedback of the sidelink feedback information can be further ensured.

The second condition may further include: the first symbol occupied by the first channel is not earlier than a preparation time for sending the sidelink feedback information, to avoid a problem that the first communications apparatus may feed back inaccurate sidelink feedback information because the first communications apparatus still sends the sidelink feedback information through the first channel when the first symbol occupied by the first channel is earlier than the preparation time for sending the sidelink feedback information and the first communications apparatus still performs feedback when the first communications apparatus has not completed preparation of the sidelink feedback information; or the last symbol occupied by the first channel is not earlier than a preparation time for sending the sidelink feedback information, to avoid a problem that the first communications apparatus may feed back inaccurate sidelink feedback information because the first communications apparatus still sends the sidelink feedback information through the first channel when the last symbol occupied by the first channel is earlier than the preparation time for sending the sidelink feedback information and the first communications apparatus still performs feedback when the first communications apparatus has not completed preparation of the sidelink feedback information. According to this design, a success rate and accuracy of feeding back the sidelink feedback information can be further improved.

It should be understood that the first communications apparatus may further send the reference signal to the second communications apparatus after determining that some or all of the foregoing second conditions are met.

In a possible design, a sending resource allocated to the sidelink feedback information completely or partially overlaps with a sending resource of the first channel in time domain.

In a possible design, the first channel may be at least one of a sidelink feedback channel PSFCH, a sidelink control channel PSCCH, a sidelink data channel PSSCH, an uplink control channel PUCCH, or an uplink data channel PUSCH. Specifically, if the first communications apparatus determines that a control channel and a data channel are multiplexed in a time division multiplexing TDM manner, the first channel may be a control channel. Alternatively, if the first communications apparatus determines that a control channel and a data channel are multiplexed in an embedded manner, the first channel may be a control channel. Alternatively, if the first communications apparatus determines that a control channel and a data channel are multiplexed in a frequency division multiplexing FDM manner, the first channel may be a data channel. Herein, the control channel may include a PSCCH and a PUCCH, and the data channel may include a PSSCH and a PUSCH. According to the foregoing design, impact of sending the sidelink feedback information on the first channel on data originally transmitted on the first channel can be reduced, and incompatibility between sending of the data and sending of the sidelink feedback information can be avoided.

In a possible design, the sidelink feedback information may include at least one of the following information: a receiving response, channel state information, or a scheduling request. The reference signal may carry the at least one of the receiving response, the channel state information, or the scheduling request The receiving response includes an acknowledgement, a negative acknowledgement, or discontinuous transmission. The channel state information includes at least one of the following information: a channel quality indicator CQI, a precoding matrix indicator PMI, a rank indicator RI, reference signal received power RSRP, reference signal received quality RSRQ, a path loss, a sounding reference signal SRS resource indicator SRI, a channel state information reference signal CSI-RS resource indicator CRI, a received signal strength indicator RSSI, a precoding type indicator PTI, a moving direction of a vehicle, or an interference condition.

If a second communications apparatus performs the method, the second communications apparatus may receive sidelink feedback information from a first communications apparatus through a first channel, where the first channel may be at least one of a sidelink control channel PSCCH, a sidelink data channel PSSCH, an uplink control channel PUCCH, or an uplink data channel PUSCH.

In a possible design, the sidelink feedback information may include at least one of the following information: a receiving response, channel state information, or a scheduling request. The reference signal may carry the at least one of the receiving response, the channel state information, or the scheduling request. The receiving response includes an acknowledgement, a negative acknowledgement, or discontinuous transmission. The channel state information includes at least one of the following information: a channel quality indicator CQI, a precoding matrix indicator PMI, a rank indicator RI, reference signal received power RSRP, reference signal received quality RSRQ, a path loss, a sounding reference signal SRS resource indicator SRI, a channel state information reference signal CSI-RS resource indicator CRI, a received signal strength indicator RSSI, a precoding type indicator PTI, a moving direction of a vehicle, or an interference condition.

According to a third aspect, this application provides a communications apparatus. For example, the communications apparatus is the first communications apparatus and/or the second communications apparatus described above. The communications apparatus may be configured to perform the method according to any one of the first aspect or the possible implementations of the first aspect, or configured to perform the method according to any one of the second aspect or the possible implementations of the second aspect. Specifically, the communications apparatus may include modules configured to perform the method according to any one of the first aspect or the possible implementations of the first aspect or the method according to any one of the second aspect or the possible implementations of the second aspect. For example, the communications apparatus includes a processing module and a communications module that are coupled to each other. For example, the communications apparatus may be a terminal device or a network device.

When the method performed by the first communications apparatus according to any one of the first aspect or the possible implementations of the first aspect is performed, the processing module may be configured to determine sidelink feedback information. The communications module may be configured to send a reference signal to the second communications apparatus, where the reference signal carries the sidelink feedback information.

In a possible design, that the reference signal carries the sidelink feedback information includes: The reference signal carries some or all of the sidelink feedback information.

In a possible design, when the reference signal carries the sidelink feedback information, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal (the bandwidth of the reference signal may be represented by a quantity of RBs), an RB number of the reference signal, a type of the reference signal, or a type of a channel to which the reference signal belongs.

In a possible design, the communications module may send the reference signal to the second communications apparatus after it is determined that at least one of the following conditions is met: the sidelink feedback information includes a receiving response; the sidelink feedback information does not include channel state information; a length of the sidelink feedback information is not greater than a first length; the reference signal is a reference signal on a physical sidelink control channel PSCCH; the reference signal is a reference signal on a physical uplink control channel PUCCH; the reference signal is a reference signal on a physical sidelink shared channel PSSCH; the reference signal is a reference signal on a physical uplink shared channel PUSCH; the first symbol occupied by the reference signal is not later than sending timing for sending the sidelink feedback information; the last symbol occupied by the reference signal is not later than sending timing for sending the sidelink feedback information; the first symbol occupied by the reference signal is not earlier than a preparation time for sending the sidelink feedback information; or the last symbol occupied by the reference signal is not earlier than a preparation time for sending the sidelink feedback information.

In a possible design, the reference signal may be a reference signal on a control channel, or the reference signal may be a reference signal on a data channel.

In a possible design, the communications module may be further configured to send indication information to the second communications apparatus, where the indication information is used to indicate a type of the sidelink feedback information carried by using the reference signal; the indication information is used to indicate that the sidelink feedback information is carried by using the reference signal; or if the reference signal is the reference signal on the data channel, the indication information is used to indicate that the sidelink feedback information is carried by using the data channel and the reference signal.

In a possible design, a sending resource allocated to the sidelink feedback information may completely or partially overlap with a sending resource of the control channel in time domain. Alternatively, a sending resource allocated to the sidelink feedback information may completely or partially overlap with a sending resource of the data channel in time domain.

In a possible design, the sidelink feedback information may include at least one of the following information: a receiving response, channel state information, or a scheduling request.

In a possible design, the receiving response may include an acknowledgement, a negative acknowledgement, or discontinuous transmission.

In a possible design, the channel state information may include at least one of the following information: a channel quality indicator CQI, a precoding matrix indicator PMI, a rank indicator RI, reference signal received power RSRP, reference signal received quality RSRQ, a path loss, a sounding reference signal SRS resource indicator SRI, a channel state information reference signal CSI-RS resource indicator CRI, a received signal strength indicator RSSI, a precoding type indicator PTI, a moving direction of a vehicle, or an interference condition.

When the method performed by the second communications apparatus according to any one of the first aspect or the possible implementations of the first aspect is performed, the communications module may be configured to receive a reference signal from a first communications apparatus, where the reference signal carries the sidelink feedback information. The processing module may be configured to determine the sidelink feedback information based on the reference signal.

In a possible design, that the reference signal carries the sidelink feedback information includes: The reference signal may carry some or all of the sidelink feedback information.

In a possible design, when the reference signal carries the sidelink feedback information, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal (the bandwidth of the reference signal may be represented by a quantity of RBs), an RB number of the reference signal, a type of the reference signal, or a type of a channel to which the reference signal belongs.

In a possible design, the reference signal may be a reference signal on a control channel, or the reference signal may be a reference signal on a data channel.

In a possible design, the communications module may be further configured to receive indication information from the first communications apparatus, where the indication information is used to indicate a type of the sidelink feedback information carried by using the reference signal; the indication information is used to indicate that the sidelink feedback information is carried by using the reference signal; or if the reference signal is the reference signal on the data channel, the indication information is used to indicate that the sidelink feedback information is carried by using the data channel and the reference signal.

In a possible design, a sending resource allocated to the sidelink feedback information may completely or partially overlap with a sending resource of the control channel in time domain. Alternatively, a sending resource allocated to the sidelink feedback information may completely or partially overlap with a sending resource of the data channel in time domain.

In a possible design, the sidelink feedback information may include at least one of the following information: a receiving response, channel state information, or a scheduling request.

In a possible design, the receiving response may include an acknowledgement, a negative acknowledgement, or discontinuous transmission.

In a possible design, the channel state information may include at least one of the following information: a channel quality indicator CQI, a precoding matrix indicator PMI, a rank indicator RI, reference signal received power RSRP, reference signal received quality RSRQ, a path loss, a sounding reference signal SRS resource indicator SRI, a channel state information reference signal CSI-RS resource indicator CRI, a received signal strength indicator RSSI, a precoding type indicator PTI, a moving direction of a vehicle, or an interference condition.

When the method performed by the first communications apparatus according to any one of the second aspect or the possible implementations of the second aspect is performed, the processing module may be configured to determine that a second condition is met; and the communications module may be configured to send sidelink feedback information on a first channel, where the second condition includes at least one of the following conditions: the first symbol occupied by the first channel is not later than sending timing for sending the sidelink feedback information; the last symbol occupied by the first channel is not later than sending timing for sending the sidelink feedback information; the first symbol occupied by the first channel is not earlier than a preparation time for sending the sidelink feedback information; or the last symbol occupied by the first channel is not earlier than a preparation time for sending the sidelink feedback information.

In a possible design, a sending resource allocated to the sidelink feedback information may completely or partially overlap with a sending resource of the first channel in time domain.

In a possible design, the first channel may be at least one of the following: a sidelink feedback channel PSFCH, a sidelink control channel PSCCH, a sidelink data channel PSSCH, an uplink control channel PUCCH, or an uplink data channel PUSCH.

In a possible design, if a control channel and a data channel are multiplexed in a time division multiplexing TDM manner, the first channel may be a control channel. Alternatively, if a control channel and a data channel are multiplexed in an embedded manner, the first channel may be a control channel. Alternatively, if a control channel and a data channel are multiplexed in a frequency division multiplexing FDM manner, the first channel may be a data channel.

In a possible design, the sidelink feedback information includes at least one of the following information: a receiving response, channel state information, or a scheduling request.

When the method performed by the first communications apparatus according to any one of the second aspect or the possible implementations of the second aspect is performed, the communications module may be configured to receive sidelink feedback information from a first communications apparatus through a first channel, where the first channel is at least one of the following: a sidelink feedback channel PSFCH, a sidelink control channel PSCCH, a sidelink data channel PSSCH, an uplink control channel PUCCH, or an uplink data channel PUSCH.

In a possible design, the sidelink feedback information includes at least one of the following information: a receiving response, channel state information, or a scheduling request.

The receiving response includes an acknowledgement, a negative acknowledgement, or discontinuous transmission. The channel state information includes at least one of the following information: a channel quality indicator CQI, a precoding matrix indicator PMI, a rank indicator RI, reference signal received power RSRP, reference signal received quality RSRQ, a path loss, a sounding reference signal SRS resource indicator SRI, a channel state information reference signal CSI-RS resource indicator CRI, a received signal strength indicator RSSI, a precoding type indicator PTI, a moving direction of a vehicle, or an interference condition.

According to a fourth aspect, a communications system is provided. The communications system may include any communications apparatus according to the third aspect. The communications apparatus may be configured to perform the method according to any one of the first aspect or the possible designs of the first aspect, or configured to perform the method according to any one of the second aspect or the possible designs of the second aspect.

According to a fifth aspect, a computer storage medium is provided. The computer readable storage medium stores instructions, and when the instructions are run on a computer, the computer is enabled to perform the method according to any one of the first aspect or the possible designs of the first aspect, or to perform the method according to any one of the second aspect or the possible designs of the second aspect.

According to a sixth aspect, a computer program product including instructions is provided. When the computer program product runs on a computer, the computer is enabled to perform the method according to any one of the first aspect or the possible designs of the first aspect, or to perform the method according to any one of the second aspect or the possible designs of the second aspect.

According to a seventh aspect, an embodiment of this application provides a chip system. The chip system includes a processor, and may further include a memory. The processor is configured to perform the method according to any one of the first aspect or the possible designs of the first aspect, or configured to perform the method according to any one of the second aspect or the possible designs of the second aspect. The chip system may include a chip, or may include a chip and another discrete component.

For beneficial effects of the third aspect to the seventh aspect and the implementations of the third aspect to the seventh aspect, refer to the descriptions of the beneficial effects of the method in the first aspect and the possible designs of the method in the first aspect or the method in the second aspect and the possible designs of the method in the second aspect.

DESCRIPTION OF EMBODIMENTS

Figure 1:
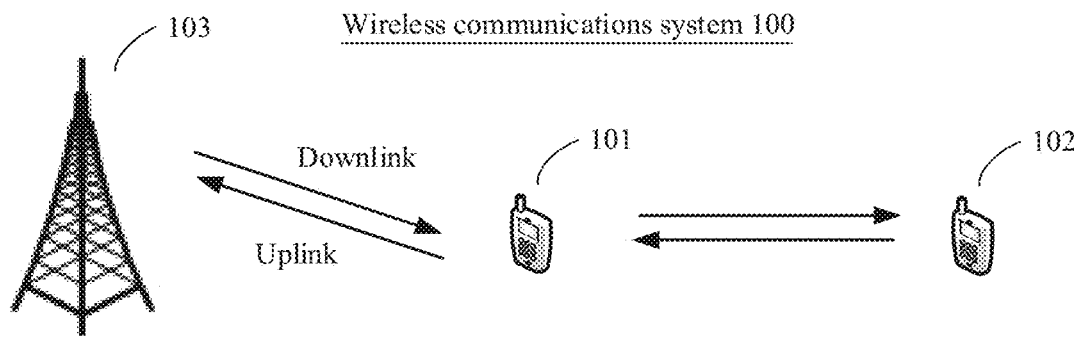
FIG. 1 is a schematic architectural diagram of a wireless communications system according to this application.

To make objectives, technical solutions, and advantages of this application clearer, the following further describes this application in detail with reference to accompanying drawings. A specific operation method in a method embodiment may also be applied to an apparatus embodiment or a system embodiment.

The following explains terms in this application.

"At least one" means one or more, that is, one, two, three, or more.

"A plurality of" means two or more, that is, two, three, or more.

Bearing may mean that a message, a signal, or signaling is used to carry or indicate information or data, or may mean that a message, a signal, or signaling includes information.

A sidelink is used for communication between terminals, including device-to-device (D2D) communication, vehicle-to-everything (V2X) communication, and the like.

A physical sidelink shared channel (PSSCH) is a sidelink channel used to transmit terminal user data.

A physical sidelink control channel (PSCCH) is a sidelink channel used to transmit control information. The control information may be sidelink control information (SCI). The control information transmitted on the PSCCH may be used to schedule terminal user data transmitted on a PSSCH.

Sidelink unicast means that a terminal transmits information to another terminal. Sidelink multicast means that a terminal transmits information to a plurality of terminals. Sidelink broadcast means that a terminal transmits information to all terminals within coverage of the terminal.

A physical sidelink feedback channel (PSFCH) is a channel on which a terminal device carries sidelink feedback information over a sidelink in a scenario in which feedback needs to be performed. The sidelink feedback information may include sidelink feedback control information (SFCI). The sidelink feedback information may include but is not limited to at least one of channel state information (CSI), a receiving response (for example, a hybrid automatic repeat request (HARQ) acknowledgement (ACK)), or a scheduling request (SR). In the embodiments of this application, the receiving response may include but is not limited to at least one of an acknowledgement (ACK), a negative acknowledgement (NACK), or discontinuous transmission (DTX). The channel state information CSI may include but is not limited to at least one of a channel quality indicator (CQI), a precoding matrix indicator (PMI), a rank indicator (RI), reference signal received power (RSRP), reference signal received quality (RSRQ), a path loss (PL), a sounding reference signal (SRS) resource indicator (SRS resource indicator, SRI), a channel state information reference signal (CSI-RS) resource indicator (CSI-RS resource indicator, CRI), a received signal strength indicator (RSSI), a precoding type indicator (PTI), a moving direction of a vehicle, and an interference condition.

The following describes the embodiments of this application in detail with reference to the accompanying drawings. First, a wireless communications system provided in the embodiments of this application is described. A communication method provided in this application may be applied to the system. Then, the communication method provided in the embodiments of this application is described. Finally, a terminal and a network device provided in the embodiments of this application are described.

As shown in FIG. 1, a wireless communications system 100 provided in an embodiment of this application includes a terminal 101, a terminal 102, and a network device 103. An application scenario of the wireless communications system 100 includes but is not limited to a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, a new radio (NR) communications system, an NR vehicle-to-everything (V2X) system, a future mobile communication-based internet of vehicles system, or the like. It should be understood that the wireless communications system 100 provided in this embodiment of this application is applicable to both a low-frequency scenario (sub 6G) and a high-frequency scenario (above 6G).

For example, the terminal 101 and the terminal 102 each may be a device such as a terminal, a mobile station (MS), a mobile terminal, a device-to-device (D2D) communication terminal device, a vehicle-to-everything (V2X) communication terminal device, a machine-to-machine/machine type communication (M2M/MTC) terminal device, or an internet of things (IoT) terminal device, or an apparatus such as a chip or a chip system. The terminal 101 can communicate with one or more network devices in one or more communications systems, and accept a network service provided by the network device. The network device herein includes but is not limited to the network device 103 shown in the figure. For example, in this embodiment of this application, the terminal 101 and the terminal 102 each may be a mobile phone (or referred to as a "cellular" phone) or a computer having a mobile terminal. Alternatively, the terminal 101 and the terminal 102 each may be a portable, pocket-sized, handheld, computer built-in, or in-vehicle mobile apparatus. Alternatively, the terminal 101 and the terminal 102 each may be a communications chip having a communications module. It should be understood that the terminal 101 may be configured to support communication with the network device 103 over a universal user to network interface (Uu interface), and/or the terminal 101 and the terminal 102 may be configured to support sidelink transmission. For example, the terminal 101 and the terminal 102 may perform sidelink communication over a direct communication (PC5) interface (namely, an air interface used for sidelink communication between terminals).

The network device 103 may include a base station (BS), or include a base station, a radio resource management device configured to control the base station, and the like. The base station herein may be a base transceiver station (BTS) in a GSM or CDMA system, may be a NodeB (NB) in a WCDMA system, may be an evolved NodeB (Evolutional NodeB, eNB or eNodeB), a micro/pico eNB, or a transmission reception point (transmission/reception point, TRP) in an LTE system, or may be a radio controller in a cloud radio access network (CRAN) scenario. Alternatively, the base station 200 may be a relay station, an access point, a vehicle-mounted device, a wearable device, a base station in a future 5G network, a base station in a future evolved PLMN network, for example, an NR base station, or the like. Alternatively, for example, a network device in a V2X technology is a road side unit (RSU). This is not limited in this embodiment of this application.

Optionally, a communication link between terminal devices may be a D2D link or a sidelink. In the internet of vehicles, the communication link between the terminal devices may alternatively be a vehicle-to-vehicle (V2V) link, a vehicle-to-pedestrian (V2P) link, a vehicle-to-infrastructure (V2I) link, or a vehicle-to-everything (vehicle-to-X, V2X) link. In the following embodiments of this application, a sidelink is mainly used to describe communication transmission between terminal devices, and a cellular link is mainly used to describe communication transmission between a network device and a terminal device. At least one of unicast communication, multicast communication, and broadcast communication between the terminal devices may be performed over the sidelink.

Figure 2:
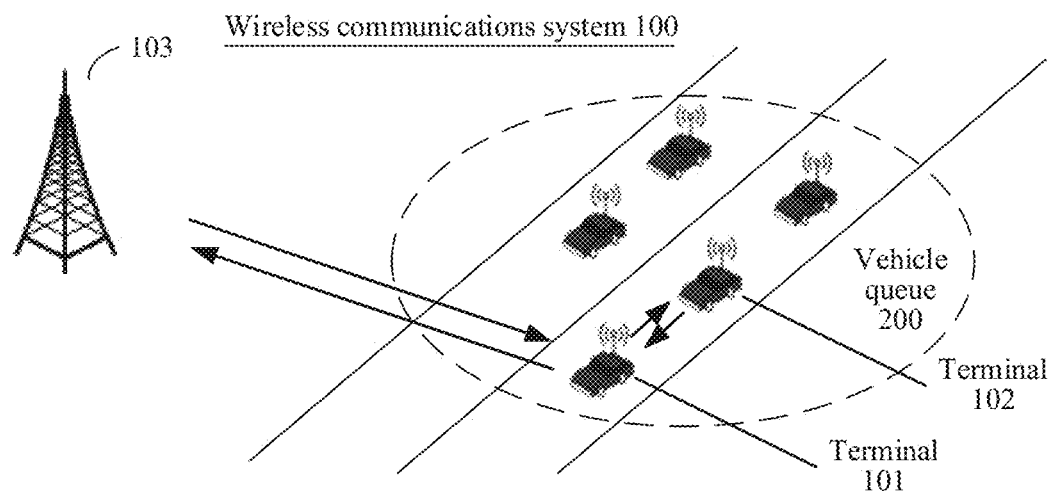
FIG. 2 is a schematic architectural diagram of another wireless communications system according to this application.

The following further describes, by using a V2X scenario shown in FIG. 2 as an example, an application scenario of a wireless communications system 100 provided in an embodiment of this application.

As shown in FIG. 2, the wireless communications system 100 is applicable to a wireless communications system including a vehicle queue 200. The vehicle queue 200 includes a plurality of terminals (for example, in-vehicle mobile apparatuses). A terminal 101 and a terminal 102 shown in FIG. 2 may implement transmission based on a sidelink, and the terminal 101 and the terminal 102 may implement transmission in at least one of a unicast manner, a multicast manner, and a broadcast manner. Based on the foregoing scenario, a feedback information sending method provided in the embodiments of this application may be implemented between terminals in the vehicle queue 200. For example, the terminal 101 and the terminal 102 may transmit sidelink feedback information based on a PSFCH. For example, when the terminal 102 sends sidelink feedback information to the terminal 101, the sidelink feedback information may be a feedback on data transmitted by the terminal 101 to the terminal 102 through a sidelink. The terminal 101 may transmit the data to the terminal 102 through the sidelink in at least one of the unicast manner, the multicast manner, or the broadcast manner. When the terminal 101 sends sidelink feedback information to the terminal 102, the sidelink feedback information may be a feedback on data transmitted by the terminal 102 to the terminal 101 through a sidelink. The terminal 102 may transmit the data to the terminal 101 through the sidelink in at least one of the unicast manner, the multicast manner, or the broadcast manner. Similarly, the feedback information sending method shown in this application may also be used to send sidelink feedback information between other terminals in the vehicle queue 200.

Figure 3:
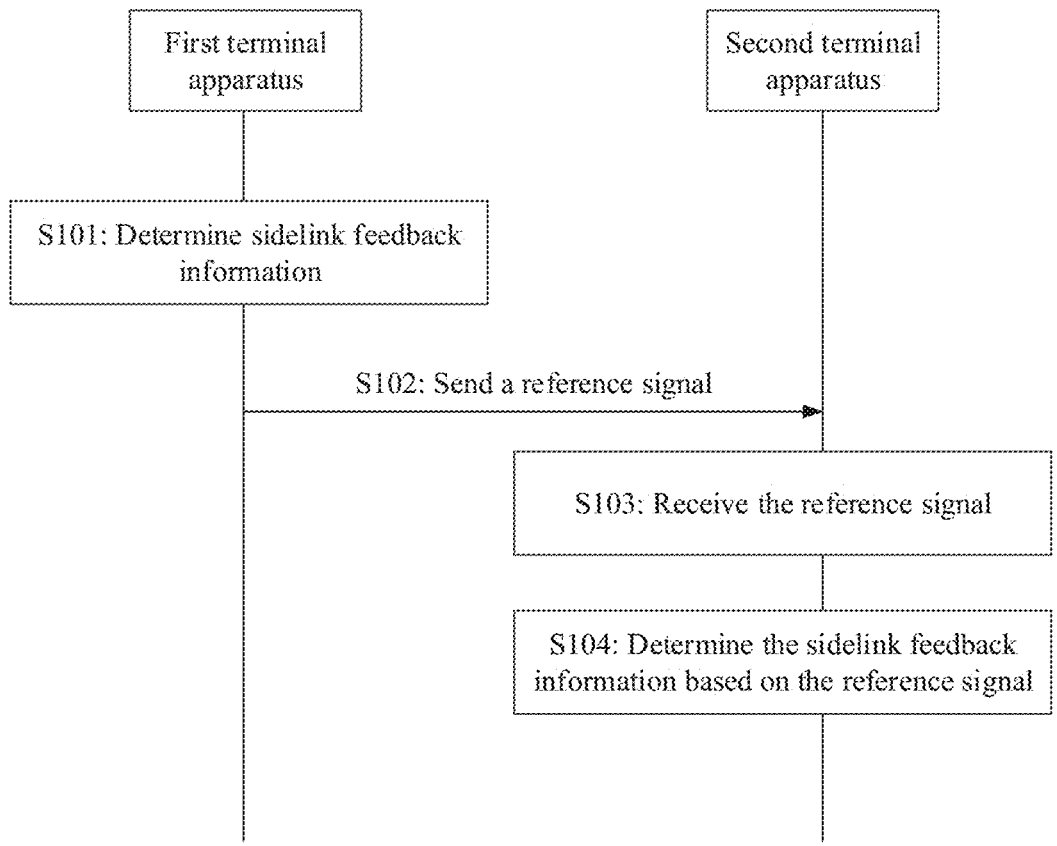
FIG. 3 is a schematic flowchart of a feedback information sending method according to this application.

The following describes, with reference to FIG. 3 by using the wireless communications system 100 shown in FIG. 2 as an example, a feedback information sending method provided in an embodiment of this application. The method may specifically include the following steps:

S101: A first terminal apparatus determines sidelink feedback information.

S102: The first terminal apparatus sends a reference signal to a second terminal apparatus, where the reference signal carries the sidelink feedback information.

S103: The second terminal apparatus receives the reference signal.

S104: The second terminal apparatus determines the sidelink feedback information based on the reference signal.

According to the foregoing method, the terminals can send and determine the sidelink feedback information by using the reference signal, to improve transmission efficiency of the sidelink feedback information.

When the terminal needs to send feedback information through both a control channel or a data channel and a PSFCH in a same slot, the terminal may use the reference signal to indicate the feedback information, and no longer needs to send the feedback information through the control channel or the data channel. Therefore, this can avoid a puncturing operation or a rate matching operation performed on the control channel or the data channel when the feedback information is sent through the control channel or the data channel, and avoid reducing original transmission efficiency of the control channel or the data channel.

For example, the first terminal apparatus and the second terminal apparatus may respectively be the terminal 101 and the terminal 102 or respectively be the terminal 102 and the terminal 101 shown in FIG. 1; and/or the first terminal apparatus and the second terminal apparatus may be the terminals in the vehicle queue 200 shown in FIG. 2.

For example, the sidelink feedback information determined by the first terminal apparatus in step S101 may include at least one of a receiving response, channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX. The ACK may be a feedback from the first terminal apparatus on successfully received user data, and the user data may be previously sent by the second terminal device through a PSSCH. The NACK and the DTX may be feedbacks from the first terminal apparatus on unsuccessfully received user data, and the user data may be previously sent by the second terminal device through the PSSCH. If the receiving response is the DTX, a systematic bit needs to be retransmitted. If the receiving response is the NACK, an additional parity bit further needs to be retransmitted.

In this embodiment of this application, the reference signal (RS) may be specifically at least one of a demodulation reference signal (DMRS), a sounding reference signal (SRS), a channel state information reference signal (CSI-RS), a phase tracking reference signal (PT-RS), a discovery reference signal (DRS), and the like.

The reference signal in the procedure shown in FIG. 3 may be a reference signal on a control channel or a data channel. Specifically, when the terminal needs to send the sidelink feedback information through both the control channel and the PSFCH in a same slot, the terminal may use the reference signal on the control channel to carry the sidelink feedback information. When the terminal needs to send the sidelink feedback information through both the data channel and the PSFCH in a same slot, the terminal may use the reference signal on the data channel to carry the sidelink feedback information. For example, the reference signal on the control channel may be a DMRS on the control channel or the data channel.

Figure 4:
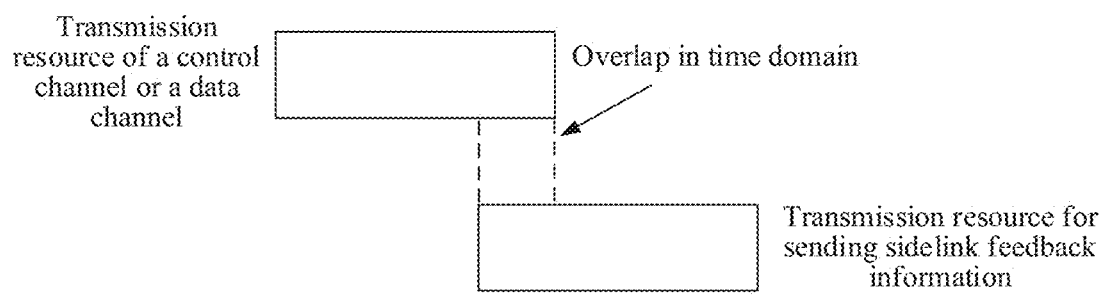
FIG. 4 is a schematic diagram of a time domain relationship between channel transmission resources according to this application.

As shown in FIG. 4, in a possible implementation, when a time domain location occupied by a transmission resource for sending a control channel or a data channel partially or completely overlaps with a time domain location occupied by a transmission resource for sending sidelink feedback information through a PSFCH, the method provided in this embodiment of this application may be used, that is, the sidelink feedback information may be carried by using the reference signal.

In this embodiment of this application, the sidelink feedback information may be indicated by using parameters of the reference signal, where the parameters may include at least one of a root sequence of the reference signal, a cyclic shift (CS) of the reference signal, an orthogonal cover code (OCC) of the reference signal, a comb of the reference signal, a symbol number (including a start symbol number or the like) of the reference signal, a quantity of symbols of the reference signal, a slot number (including a start slot number or the like) of the reference signal, a quantity of slots of the reference signal, bandwidth (which may be represented by a quantity of resource blocks (RB)) of the reference signal, a resource block RB number (including a start RB number or the like) of the reference signal, a type of the reference signal, or a type of a channel to which the reference signal belongs.

The following specifically describes a method for carrying sidelink feedback information by using a reference signal according to the method provided in this embodiment of this application.

When the sidelink feedback information is indicated by using a root sequence of a reference signal, at least one root sequence corresponding to an ACK may be preconfigured or specified in a protocol, and the root sequence may be used to indicate that the reference signal carries the ACK. Therefore, when determining that the ACK needs to be sent to the second terminal apparatus, the first terminal apparatus may send the reference signal having the root sequence; and after receiving the reference signal, the second terminal apparatus may also determine, based on the root sequence of the reference signal, that the reference signal carries the ACK. In addition, at least one root sequence corresponding to a NACK may be further preconfigured or specified in a protocol, and the root sequence may be used to indicate that the reference signal carries the NACK. Therefore, when determining that the NACK needs to be sent to the second terminal apparatus, the first terminal apparatus may send the reference signal having the root sequence; and after receiving the reference signal, the second terminal apparatus may also determine, based on the root sequence of the reference signal, that the reference signal carries the NACK.

When the sidelink feedback information is indicated by using a cyclic shift of a reference signal, each of four cyclic shifts may be used to indicate 2-bit receiving responses. For example, a correspondence between each of the four cyclic shifts and the 2-bit receiving responses is preset, and the correspondence may be shown in Table 1. Based on Table 1, when a value of the cyclic shift of the reference signal sent by the first terminal apparatus is 0, the second terminal apparatus may determine that the 2-bit receiving responses are an ACK and an ACK. When a value of the cyclic shift of the reference signal sent by the first terminal apparatus is 3, the second terminal apparatus may determine that the 2-bit receiving responses are an ACK and a NACK. When a value of the cyclic shift of the reference signal sent by the first terminal apparatus is 6, the second terminal apparatus may determine that the 2-bit receiving responses are a NACK and an ACK. When a value of the cyclic shift of the reference signal sent by the first terminal apparatus is 9, the second terminal apparatus may determine that the 2-bit receiving responses are a NACK and a NACK. It should be understood that the foregoing manner of setting the correspondence between the cyclic shift and the receiving response is merely an example for description, and the foregoing correspondence between the value of the cyclic shift and the receiving response shown in Table 1 is also merely an example. In this application, the correspondence between the cyclic shift and the receiving response may alternatively be set in another manner. For example, a correspondence between a value range of a cyclic shift and an ACK or a NACK is set, to indicate the ACK or the NACK by using a value of the cyclic shift.

TABLE 1

| Cyclic shift | 2-bit receiving responses |
| --- | --- |
| 0 | ACK and ACK |
| 3 | ACK and NACK |
| 6 | NACK and ACK |
| 9 | NACK and NACK |

When the sidelink feedback information is indicated by using an orthogonal cover code of a reference signal, a value of the orthogonal cover code may be used to indicate an ACK or a NACK. For example, it is preconfigured or agreed in a protocol that if the OCC of the reference signal is equal to [1, 1], the reference signal carries the ACK; or if the OCC of the reference signal is equal to [1, −1], the reference signal carries the NACK. Therefore, when determining that the ACK needs to be sent, the first terminal apparatus may configure the orthogonal cover code of the reference signal as [1, 1], and the second terminal apparatus may determine, based on the orthogonal cover code of the reference signal, that the reference signal carries the ACK. Alternatively, when determining that the NACK needs to be sent, the first terminal apparatus may configure the orthogonal cover code of the reference signal as [1, −1], and the second terminal apparatus may determine, based on the orthogonal cover code of the reference signal, that the reference signal carries the NACK. It should be understood that the foregoing correspondence between the value of the OCC and the ACK is merely an example for description. In this application, an OCC having another value may alternatively be used as an OCC corresponding to an ACK, to indicate the ACK by using a reference signal having the OCC. In addition, the foregoing correspondence between the value of the OCC and the NACK is also merely an example for description. In this application, an OCC having another value may alternatively be used as an OCC corresponding to a NACK, to indicate the NACK by using a reference signal having the OCC.

When the sidelink feedback information is indicated by using a comb of a reference signal, a value of the comb may be used to indicate an ACK or a NACK. For example, it is preconfigured or agreed in a protocol that if the comb comb of the reference signal is equal to 0, the reference signal carries the ACK; or if the comb of the reference signal is equal to 1, the reference signal carries the NACK. Therefore, when determining that the ACK needs to be sent, the first terminal apparatus may configure the comb of the reference signal as 0, and the second terminal apparatus may determine, based on the comb of the reference signal, that the reference signal carries the ACK. Alternatively, when determining that the NACK needs to be sent, the first terminal apparatus may configure the comb of the reference signal as 1, and the second terminal apparatus may determine, based on the comb of the reference signal, that the reference signal carries the NACK. It should be understood that the foregoing correspondence between the value of the comb and the ACK is merely an example for description. In this application, a comb having another value may alternatively be used as a comb corresponding to an ACK, to indicate the ACK by using a reference signal having the comb. Similarly, in this application, a comb having another value may alternatively be used as a comb corresponding to a NACK, to indicate the NACK by using a reference signal having the comb.

When the sidelink feedback information is indicated by using a symbol number of a reference signal, a symbol number corresponding to a CQI may be preconfigured or agreed on in a protocol. When the reference signal is sent, the symbol number of the reference signal may be used to indicate the CQI. For example, a correspondence shown in Table 2 is set. Based on Table 2, when the first terminal apparatus determines that a CQI that needs to be fed back to the second terminal apparatus is 0, the first terminal apparatus may send a reference signal on a symbol #0. After receiving the reference signal sent on the symbol #0, the second terminal apparatus may determine, based on Table 2, that the CQI fed back by the first terminal apparatus is equal to 0. Similarly, the first terminal apparatus may further send, on a symbol corresponding to a CQI, a reference signal based on a correspondence between another value of the CQI and a symbol number shown in Table 2. The second terminal apparatus uses a CQI corresponding to a symbol number of the received reference signal as the CQI fed back by the first terminal apparatus, to indicate the CQI by using the reference signal. It should be understood that the foregoing manner of setting the correspondence between the symbol number and the CQI is merely an example for description, and the correspondence between the symbol number and the value of the CQI in Table 2 is also merely an example. In this application, the correspondence between the symbol number and the CQI may alternatively be set in another manner. For example, a correspondence between a value range of a symbol number and a CQI or a CQI function may be further set.

TABLE 2

| Symbol number | CQI |
|---|---|
| #0 | CQI = 0 |
| #4 | CQI = 4 |
| #8 | CQI = 8 |
| #12 | CQI = 12 |
| . . . | . . . |

When the sidelink feedback information is indicated by using a quantity of symbols of a reference signal, a reference signal that occupies n symbols may be used to indicate that CQI=m, where n and m each are 0 or a positive integer. For example, when determining that a CQI that needs to be fed back to the second terminal apparatus is 0, the first terminal apparatus may send, to the second terminal apparatus, a reference signal that occupies one symbol. After receiving the reference signal that occupies one symbol, the second terminal apparatus determines that the CQI fed back by the first terminal apparatus is 0. For another example, the first terminal apparatus may alternatively send, to the second terminal apparatus, a reference signal that occupies two symbols, to indicate that CQI=1. The first terminal apparatus may alternatively send, to the second terminal apparatus, a reference signal that occupies three symbols, to indicate that CQI=8. It should be understood that the foregoing correspondence between the quantity of symbols of the reference signal and the value of the CQI is merely an example for description. In this application, another correspondence between the quantity of symbols and the value of the CQI may be further set.

When the sidelink feedback information is indicated by using a slot number of a reference signal, a slot number corresponding to a CQI may be preconfigured or agreed on in a protocol. When the reference signal is sent, the slot number of the reference signal may be used to indicate the CQI. For example, a correspondence shown in Table 3 is set. Based on Table 3, when the first terminal apparatus determines that a CQI that needs to be fed back to the second terminal apparatus is 0, the first terminal apparatus may send a reference signal in a slot #0. After receiving the reference signal sent in the slot #0, the second terminal apparatus may determine, based on Table 3, that the CQI fed back by the first terminal apparatus is equal to 0. Similarly, the first terminal apparatus may further send, in a slot corresponding to a CQI, a reference signal based on a correspondence between another value of the CQI and a slot number shown in Table 2. The second terminal apparatus uses a CQI corresponding to a slot number of the received reference signal as the CQI fed back by the first terminal apparatus, to indicate the CQI by using the reference signal. It should be understood that the foregoing manner of setting the correspondence between the slot number and the CQI is merely an example for description, and the correspondence between the symbol number and the value of the CQI in Table 3 is also merely an example. In this application, the correspondence between the slot number and the CQI may alternatively be set in another manner. For example, a correspondence between a value range of a slot number and a CQI or a CQI function may be further set.

TABLE 3

| Slot number | CQI |
|---|---|
| #0 | CQI = 0 |
| #4 | CQI = 4 |
| #8 | CQI = 8 |
| #12 | CQI = 12 |
| . . . | . . . |

When the sidelink feedback information is indicated by using bandwidth or a quantity of RBs of a reference signal, bandwidth/a quantity of RBs corresponding to a CQI may be preconfigured or agreed on in a protocol. When the reference signal is sent, the bandwidth/the quantity of RBs of the reference signal may be used to indicate the CQI. For example, a correspondence shown in Table 4 is set. Based on Table 4, when the first terminal apparatus determines that a CQI that needs to be fed back to the second terminal apparatus is 0, the first terminal apparatus may set bandwidth occupied by a reference signal to one RB. After receiving the reference signal that occupies the bandwidth of one RB, the second terminal apparatus may determine, based on Table 4, that the CQI fed back by the first terminal apparatus is equal to 0. Similarly, the first terminal apparatus may further send, based on bandwidth corresponding to a CQI, a reference signal based on a correspondence between another value of the CQI and bandwidth or a quantity of RBs shown in Table 4. The second terminal apparatus uses a CQI corresponding to bandwidth of the received reference signal as the CQI fed back by the first terminal apparatus, to indicate the CQI by using the reference signal. It should be understood that the foregoing manner of setting the correspondence between the bandwidth or the quantity of RBs and the CQI is merely an example for description, and the correspondence between the bandwidth or the quantity of RBs and the value of the CQI in Table 4 is also merely an example. In this application, the correspondence between the bandwidth or the quantity of RBs and the CQI may alternatively be set in another manner. For example, a correspondence between a value range of bandwidth or a quantity of RBs and a CQI or a CQI function may be further set. It should be understood that in this application, the quantity of RBs, a quantity of subcarriers, or another parameter may be used to indicate the bandwidth.

TABLE 4

| Bandwidth or quantity of RBs | CQI |
|---|---|
| one RB | CQI = 0 |
| Four RBs | CQI = 3 |
| Nine RBs | CQI = 8 |
| ... | ... |

When the sidelink feedback information is indicated by using an RB number (for example, the start RB number) of a reference signal, an RB number corresponding to a CQI may be preconfigured or agreed on in a protocol. When the reference signal is sent, the RB number of the reference signal may be used to indicate the CQI. For example, a correspondence between a start RB number (a range within which the start RB number falls) and a CQI may be preset. For example, a correspondence shown in Table 5 is set. Based on Table 5, when the first terminal apparatus determines that a CQI that needs to be fed back to the second terminal apparatus is 0, the first terminal apparatus may send a reference signal on a frequency domain resource whose start RB number is N1. After receiving the reference signal on a frequency domain resource whose start RB number is N, the second terminal apparatus may determine, based on Table 5, that N falls within a range of 0 to N1, and determine that the CQI fed back by the first terminal apparatus is equal to 0. When the first terminal apparatus determines that a CQI that needs to be fed back to the second terminal apparatus is 1, the first terminal apparatus may send a reference signal on a frequency domain resource whose start RB number is a value between N1 and N2. After receiving the reference signal on the frequency domain resource whose start RB number is between N1 and N2, the second terminal apparatus may determine, based on Table 5, that the CQI fed back by the first terminal apparatus is equal to 1. Similarly, the first terminal apparatus may further send a reference signal based on a start RB number (a range within which the start RB number falls) corresponding to a CQI and based on a correspondence between another value of the CQI and the start RB number of the reference signal shown in Table 5. The second terminal apparatus uses a CQI corresponding to a start RB number (a range within which the start RB number falls) of the received reference signal as the CQI fed back by the first terminal apparatus, to indicate the CQI by using the reference signal. It should be understood that the foregoing manner of setting the correspondence between the start RB number (the range within which the start RB number falls) of the reference signal and the CQI is merely an example for description, and the correspondence between the bandwidth or the quantity of RBs and the value of the CQI in Table 5 is also merely an example. In this application, the correspondence between the bandwidth or the quantity of RBs and the CQI may alternatively be set in another manner.

TABLE 5

| Start RB number (or a range within which the RB number falls) | CQI |
|---|---|
| (0, N1] | CQI = 0 |
| (N1, N2] | CQI = 1 |
| (N2, N3] | CQI = 2 |
| ... | ... |

In addition, in an implementation, the quantity of RBs of the reference signal may also be determined based on the RB number of the reference signal. In this case, the first terminal apparatus may indicate the CQI to the second terminal apparatus with reference to the correspondence between the bandwidth or the quantity of RBs and the CQI shown in Table 4.

When the sidelink feedback information is indicated by using a type of a reference signal, a correspondence between a type of a reference signal and a receiving response may be preconfigured or agreed on in a protocol, and the receiving response is carried by using a specific type of reference signal. For example, when a reference signal (for example, a DMRS) sent by the first terminal apparatus is a front-loaded reference signal, a receiving response, that is, an ACK, is carried. When a reference signal (for example, a DMRS) sent by the first terminal apparatus is a non-front-loaded reference signal, a receiving response, that is, a NACK, is carried.

When the sidelink feedback information is indicated by using a type of a channel to which the reference signal belongs, a correspondence between a type of a channel to which a reference signal belongs and a receiving response may be preconfigured or agreed on in a protocol, and the receiving response is carried by using a channel to which a specific type of reference signal belongs. For example, when the first terminal apparatus sends a reference signal (for example, a DMRS) on a PSCCH, a receiving response, that is, an ACK, is carried. When the first terminal apparatus sends a reference signal (for example, a DMRS) on a PSSCH, a receiving response, that is, a NACK, is carried. For another example, when the first terminal apparatus sends a reference signal (for example, a DMRS) on a PSCCH, a receiving response, that is, an ACK or a NACK, is carried. When the first terminal apparatus sends a reference signal (for example, a DMRS) on a PSSCH, channel state information CSI is carried.

It should be understood that the foregoing manner of carrying the sidelink feedback information by using the reference signal is merely an example for description. In this application, the sidelink feedback information may be indicated in any one of the foregoing manners or any combination of the plurality of the foregoing manners.

For example, in this application, the sidelink feedback information may be further indicated by using a combination of a symbol number of a symbol on which a reference signal is located and a cyclic shift. For example, when a reference signal is sent on symbol numbers #5 and #13, the reference signal may carry a receiving response. When an ACK needs to be sent, the first terminal apparatus may send, on the symbol #5, a reference signal whose cyclic shift CS is equal to 3, or send, on the symbol #13, a reference signal whose cyclic shift CS is equal to 3. When a NACK needs to be sent, the first terminal apparatus may send, on the symbol #5, a reference signal whose CS is not equal to 3, or send, on the symbol #13, a reference signal whose cyclic shift CS is not equal to 3.

In addition, in an implementation, the receiving response may be further indicated by using the reference signal (for example, the DMRS) that is on the PSCCH and that is sent by the first terminal apparatus to the second terminal apparatus; and/or the CQI may be further indicated by using the reference signal (for example, the DMRS) that is on the PSSCH and that is sent by the first terminal apparatus to the second terminal apparatus. For a specific method for indicating the ACK, the NACK, and/or the CQI, refer to the descriptions in the embodiments of this application.

It should be understood that in this embodiment of this application, one type of sidelink feedback information (for example, any one of the receiving response, the CQI, or the scheduling request) may be indicated by using one or more of the foregoing plurality of parameters of the reference signal, or a plurality of types of sidelink feedback information (for example, any combination of the receiving response, the CQI, and the scheduling request) may be indicated by using one or more of the foregoing plurality of parameters of the reference signal. This is not specifically limited in this application.

In addition, it should be understood that in this embodiment of this application, the first terminal apparatus may use the reference signal to carry all sidelink feedback information, so that the first terminal apparatus no longer needs to send the sidelink feedback information to the second terminal apparatus. In this application, the first terminal apparatus may alternatively use the reference signal to carry some sidelink feedback information, and send the other sidelink feedback information to the second terminal apparatus through a PSFCH. When the first terminal apparatus needs to send all the sidelink feedback information through both the control channel (or the data channel) and the PSFCH in a same slot, the first terminal apparatus may further indicate, to the second terminal apparatus by using a reference signal on the control channel (or the data channel), some sidelink feedback information that originally needs to be sent through the PSFCH, and send the other sidelink feedback information to the second terminal apparatus through the data channel. During sending of the sidelink feedback information through the data channel, a puncturing operation or a rate matching operation further needs to be performed on data originally transmitted on the data channel, to carry the sidelink feedback information.

For example, in the foregoing example, if the first terminal apparatus needs to feed back the receiving response and the CQI to the second terminal apparatus, the first terminal apparatus may indicate the receiving response to the second terminal apparatus by using the reference signal on the control channel (or the data channel), and send the CQI to the second terminal apparatus through the data channel.

In a possible implementation, the first terminal apparatus may further send the reference signal to the second terminal apparatus when at least one of preset conditions is met, to carry the sidelink feedback information by using the reference signal. The preset conditions may include:

Condition 1: The sidelink feedback information includes the receiving response. The first terminal apparatus may indicate, to the second terminal apparatus by using the reference signal, the sidelink feedback information whose type is the receiving response.

Condition 2: The sidelink feedback information does not include the channel state information, but includes only the receiving response or includes the receiving response and the scheduling request. The first terminal apparatus may indicate, to the second terminal apparatus by using the reference signal, the sidelink feedback information whose type is the receiving response.

Condition 3: A length of the sidelink feedback information is not greater than a first length. When the length of the sidelink feedback information is not greater than the first length, the first terminal apparatus may indicate the sidelink feedback information to the second terminal apparatus by using the reference signal. The first length may be a preset length (for example, 2 bits), or may be a threshold configured by a base station (for example, the network device 103).

Condition 4: The reference signal is a reference signal on a PSCCH. If the control channel shown in FIG. 4 is the PSCCH, when the first terminal apparatus determines that a time domain location occupied by a transmission resource for sending the sidelink feedback information through a PSFCH partially or completely overlaps with a time domain location occupied by a transmission resource for sending the PSCCH, the first terminal apparatus may indicate the sidelink feedback information to the second terminal apparatus by using the reference signal on the PSCCH.

Condition 5: The reference signal is a reference signal on a physical uplink shared channel (PUCCH). If the control channel shown in FIG. 4 is the PUCCH, when the first terminal apparatus determines that a time domain location occupied by a transmission resource for sending the sidelink feedback information through a PSFCH partially or completely overlaps with a time domain location occupied by a transmission resource for sending the PUCCH, the first terminal apparatus may indicate the sidelink feedback information to the second terminal apparatus by using the reference signal on the PUCCH.

Condition 6: The reference signal is a reference signal on a PSSCH. If the data channel shown in FIG. 4 is the PSSCH, when the first terminal apparatus determines that a time domain location occupied by a transmission resource for sending the sidelink feedback information through a PSFCH partially or completely overlaps with a time domain location occupied by a transmission resource for sending the PSSCH, the first terminal apparatus may indicate the sidelink feedback information to the second terminal apparatus by using the reference signal on the PSSCH.

Condition 7: The reference signal is a reference signal on a physical uplink shared channel (PUSCH). If the data channel shown in FIG. 4 is the PUSCH, when the first terminal apparatus determines that a time domain location occupied by a transmission resource for sending the sidelink feedback information through a PSFCH partially or completely overlaps with a time domain location occupied by a transmission resource for sending the PUSCH, the first terminal apparatus may indicate the sidelink feedback information to the second terminal apparatus by using the reference signal on the PUSCH.

Condition 8: The first symbol occupied by the reference signal is not later than sending timing for sending the sidelink feedback information. If the first symbol of the reference signal is later than the sending timing for sending the sidelink feedback information, and the first terminal still uses the reference signal to carry the sidelink feedback information, the sidelink feedback information is not fed back in a timely manner. Therefore, when the first symbol occupied by the reference signal is not later than the sending timing for sending the sidelink feedback information, the first terminal apparatus may use the reference signal on the first symbol to carry the sidelink feedback information.

When the first symbol occupied by the reference signal is later than the sending timing for sending the sidelink feedback information, the first terminal apparatus does not use the reference signal to carry the sidelink feedback information.

Condition 9: The last symbol occupied by the reference signal is not later than sending timing for sending the sidelink feedback information. If the last symbol of the reference signal is later than the sending timing for sending the sidelink feedback information, and the first terminal still uses the reference signal to carry the sidelink feedback information, the sidelink feedback information is not fed back in a timely manner. Therefore, when the first symbol occupied by the reference signal is not later than the sending timing for sending the sidelink feedback information, the first terminal apparatus may use the reference signal on the last symbol or a reference signal on a symbol before the last symbol to carry the sidelink feedback information. When the last symbol occupied by the reference signal is later than the sending timing for sending the sidelink feedback information, the first terminal apparatus does not use the reference signal to carry the sidelink feedback information.

Condition 10: The first symbol occupied by the reference signal is not earlier than a preparation time for sending the sidelink feedback information. Herein, the preparation time of the sidelink feedback information includes a latency of processing the sidelink feedback information by the first terminal apparatus. If the first symbol of the reference signal is earlier than sending timing for sending the sidelink feedback information, when sending the reference signal, the first terminal apparatus may have not determined all content of the sidelink feedback information that needs to be sent, and consequently cannot feed back the sidelink feedback information. Therefore, when the first symbol occupied by the reference signal is not earlier than the preparation time for sending the sidelink feedback information, the first terminal apparatus may use the reference signal on the first symbol or a reference signal on a symbol after the first symbol to carry the sidelink feedback information. When the first symbol occupied by the reference signal is earlier than the preparation time for sending the sidelink feedback information, the first terminal apparatus does not use the reference signal to carry the sidelink feedback information.

Condition 11: The last symbol occupied by the reference signal is not earlier than a preparation time for sending the sidelink feedback information. Herein, the preparation time of the sidelink feedback information includes a latency of processing the sidelink feedback information by the first terminal apparatus. If the last symbol of the reference signal is earlier than sending timing for sending the sidelink feedback information, when sending the reference signal, the first terminal apparatus may have not determined all content of the sidelink feedback information that needs to be sent, and consequently cannot feed back the sidelink feedback information. Therefore, when the last symbol occupied by the reference signal is not earlier than the preparation time for sending the sidelink feedback information, the first terminal apparatus may use the reference signal on the last symbol to carry the sidelink feedback information. When the last symbol occupied by the reference signal is earlier than the preparation time for sending the sidelink feedback information, the first terminal apparatus does not use the reference signal to carry the sidelink feedback information.

It should be understood that before sending the reference signal to the second terminal apparatus, the first terminal apparatus may determine that some or all of the foregoing conditions are met, to further avoid impact of feeding back the sidelink feedback information on data transmission, and ensure feedback accuracy, or ensure timely feedback.

In a possible implementation, the first terminal apparatus may further send indication information to the second terminal apparatus, where the indication information may be used to indicate that the reference signal carries the sidelink feedback information. If the reference signal carries the sidelink feedback information, after receiving the indication information, the second terminal apparatus may determine the sidelink feedback information based on the reference signal. If the reference signal does not carry the sidelink feedback information, the second terminal apparatus may consider by default that the data channel carries the sidelink feedback information, and receive, through the data channel, the sidelink feedback information and data on which a puncturing operation or a rate matching operation has been performed.

Alternatively, the indication information may be used to indicate a type of the sidelink feedback information carried by using the reference signal. After receiving the indication information, the second terminal apparatus may determine the type of the sidelink feedback information based on the reference signal. The second terminal apparatus may further detect the data channel, and receive another type of sidelink feedback information through transmission on the data channel.

Alternatively, if the reference signal is the reference signal on the data channel, the indication information may be used to indicate that the sidelink feedback information is carried by using the data channel and the reference signal. In this case, the second terminal apparatus may consider by default that the data channel carries the sidelink feedback information, and receive, through the data channel, the sidelink feedback information and data on which a puncturing operation or a rate matching operation has been performed.

According to the foregoing design, the first terminal apparatus can indicate, to the second terminal apparatus, whether the sidelink feedback information is indicated by using the reference signal or the data channel, and the second terminal apparatus may perform a targeted receiving operation based on the indication information, to avoid relatively great impact on receiving of data by the second terminal apparatus.

Figure 5:
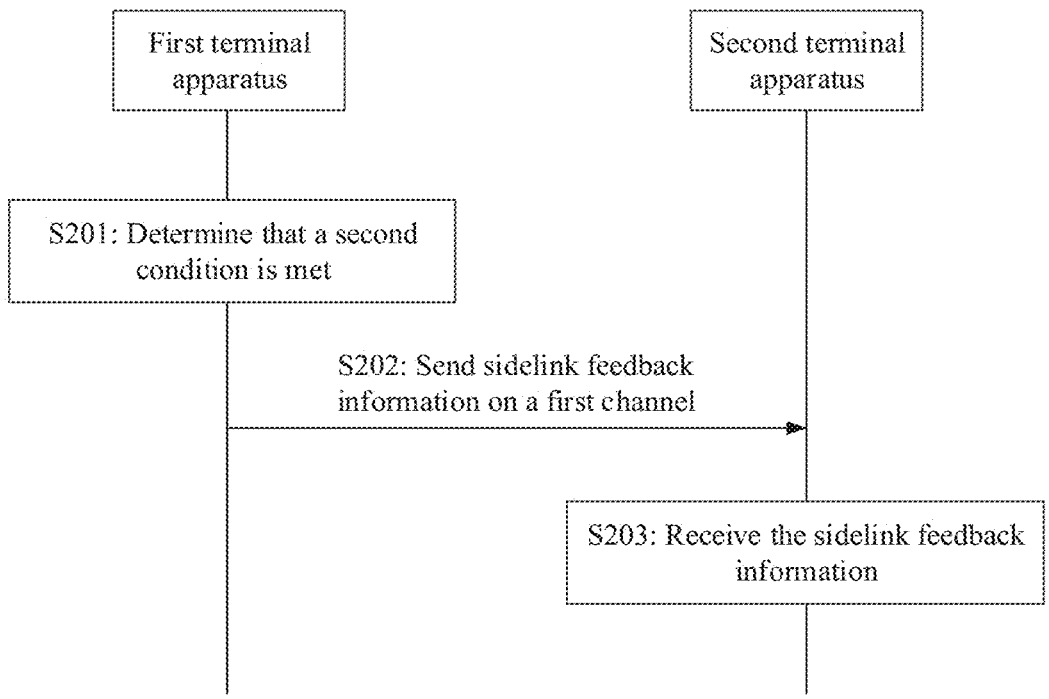
FIG. 5 is a schematic flowchart of another feedback information sending method according to this application.

As shown in FIG. 5, another feedback information sending method provided in an embodiment of this application may include the following steps:

S201: A first communications apparatus determines that a second condition is met.

S202: The first communications apparatus sends sidelink feedback information on a first channel.

S203: A second communications apparatus receives the sidelink feedback information.

The second condition includes: the first symbol occupied by the first channel is not later than sending timing for sending the sidelink feedback information, to avoid a problem that the sidelink feedback information is not fed back in a timely manner because the first communications apparatus still sends the sidelink feedback information through the first channel when the first symbol occupied by the first channel is later than the sending timing of the link feedback information.

Alternatively, the second condition includes: the last symbol occupied by the first channel is not later than sending timing for sending the sidelink feedback information, to avoid a problem that the sidelink feedback information is not fed back in a timely manner because the first communications apparatus still sends the sidelink feedback information through the first channel when the last symbol occupied by the first channel is later than the sending timing of the link feedback information.

Alternatively, the second condition includes: the first symbol occupied by the first channel is not earlier than a preparation time for sending the sidelink feedback information, to avoid a problem that the first communications apparatus may feed back inaccurate sidelink feedback information because the first communications apparatus still sends the sidelink feedback information through the first channel when the first symbol occupied by the first channel is earlier than the preparation time for sending the sidelink feedback information and the first communications apparatus still performs feedback when the first communications apparatus has not completed preparation of the sidelink feedback information.

Alternatively, the second condition includes: the last symbol occupied by the first channel is not earlier than a preparation time for sending the sidelink feedback information, to avoid a problem that the first communications apparatus may feed back inaccurate sidelink feedback information because the first communications apparatus still sends the sidelink feedback information through the first channel when the last symbol occupied by the first channel is earlier than the preparation time for sending the sidelink feedback information and the first communications apparatus still performs feedback when the first communications apparatus has not completed preparation of the sidelink feedback information.

In an implementation, the first channel may be a control channel or a data channel. Further, FIG. 4 is still used as an example. A transmission resource of the first channel partially or completely overlaps with a transmission resource for sending the sidelink feedback information in time domain. In this case, the first communications apparatus may send the sidelink feedback information through the first channel.

For example, if the first communications apparatus and the second communications apparatus each are a terminal apparatus, for example, if the first communications apparatus is the terminal 101 shown in FIG. 1, and the second terminal apparatus is the terminal 102 shown in FIG. 1, the control channel may be a PSCCH, and the data channel may be a PSSCH.

Specifically, when the first communications apparatus determines that the PSCCH and the PSSCH are multiplexed in a time division multiplexing (TDM) manner, the first communications apparatus may use the PSCCH as the first channel. A latency can be reduced because the PSCCH is in front of the PSSCH. Alternatively, when the first communications apparatus determines that the PSCCH and the PSSCH are multiplexed in an embedded manner, the first communications apparatus may use the PSCCH as the first channel. A latency can be reduced because the PSCCH is usually embedded in front of the PSSCH. Alternatively, when the first communications apparatus determines that the PSCCH and the PSSCH are multiplexed in a frequency division multiplexing FDM manner, the first communications apparatus may use the PSSCH as the first channel. In this case, there is no specific sequence between the PSCCH and the PSSCH in time domain, and a capacity of the PSCCH is limited. Therefore, the PSSCH may be selected to carry feedback information with higher overheads.

In addition, if the first communications apparatus is a terminal apparatus, and the second terminal apparatus is a base station or another network device, the control channel may be a PUCCH, and the data channel may be a PUSCH.

As shown in FIG. 1, if the first communications apparatus is the terminal 101, and the second communications apparatus is the network device 103, the sidelink feedback information sent by the terminal 101 to the network device 103 may be a NACK sent by the terminal 102 to the terminal 101, and the NACK may be used to indicate that the terminal 102 fails to receive data previously sent by the terminal 101. In this case, the terminal 101 sends the NACK to the network device 103, and may request the network device 103 to allocate a retransmission resource for the unsuccessfully received data.

In an implementation of step S202, if the first channel is the data channel, when sending the sidelink feedback information through the first channel, the first terminal apparatus further needs to perform a puncturing operation or a rate matching operation on data originally transmitted on the data channel.

Based on a same inventive concept as the foregoing method embodiments, an embodiment of this application further provides a communications apparatus. The communications apparatus may be configured to implement functions performed by the first communications apparatus and/or the second communications apparatus in the foregoing method embodiments. The functions may be implemented by hardware, or may be implemented by software or hardware executing corresponding software. The hardware or the software includes one or more modules corresponding to the functions.

Figure 6:
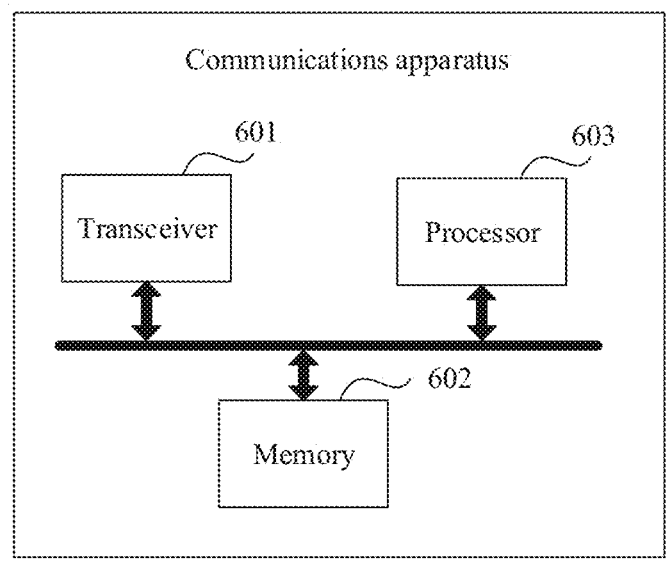
FIG. 6 shows a structure of a communications apparatus according to this application.

For example, as shown in FIG. 6, a structure of the communications apparatus may include a transceiver 601, a memory 602, and a processor 603. The transceiver 601 may be configured to perform, by the communications apparatus, communication, for example, configured to send or receive the foregoing reference signal. The memory 602 is coupled to the processor 603, and the memory 602 is configured to store program instructions and data that are necessary for the communications apparatus. The processor 603 is configured to support the communications apparatus in performing a corresponding function in the method provided in the first aspect, where the function may be implemented by invoking the program instructions stored in the memory 602. Specifically, the transceiver 601 may be a wireless transceiver, and may be configured to support the communications apparatus in receiving and sending signaling and data over a wireless air interface. The transceiver 601, the processor 603, and the memory 603 may be connected to each other by using a bus structure or another connection medium.

The following specifically describes functions of components of the communications apparatus shown in FIG. 6.

When the method performed by a first communications apparatus is performed, the processor 603 may be configured to determine sidelink feedback information. The transceiver 601 may be configured to send a reference signal to a second communications apparatus, where the reference signal carries the sidelink feedback information.

The reference signal may carry some or all of the sidelink feedback information.

When the reference signal carries the sidelink feedback information, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal, an RB number of the reference signal, a type of the reference signal, or a type of a channel to which the reference signal belongs.

The transceiver 601 may be specifically configured to send the reference signal to the second communications apparatus if the first communications apparatus determines that at least one of the following conditions is met: the sidelink feedback information includes a receiving response; the sidelink feedback information does not include channel state information; a length of the sidelink feedback information is not greater than a first length; the reference signal is a reference signal on a physical sidelink control channel PSCCH; the reference signal is a reference signal on a physical uplink control channel PUCCH; the reference signal is a reference signal on a physical sidelink shared channel PSSCH; the reference signal is a reference signal on a physical uplink shared channel PUSCH; the first symbol occupied by the reference signal is not later than sending timing for sending the sidelink feedback information; the last symbol occupied by the reference signal is not later than sending timing for sending the sidelink feedback information; the first symbol occupied by the reference signal is not earlier than a preparation time for sending the sidelink feedback information; or the last symbol occupied by the reference signal is not earlier than a preparation time for sending the sidelink feedback information.

The reference signal may be a reference signal on a control channel, or the reference signal may be a reference signal on a data channel.

The transceiver 601 may be further configured to send indication information to the second communications apparatus, where the indication information is used to indicate a type of the sidelink feedback information carried by using the reference signal; the indication information is used to indicate that the sidelink feedback information is carried by using the reference signal; or if the reference signal is the reference signal on the data channel, the indication information is used to indicate that the sidelink feedback information is carried by using the data channel and the reference signal.

For example, a sending resource allocated to the sidelink feedback information may completely or partially overlap with a sending resource of the control channel in time domain. Alternatively, a sending resource allocated to the sidelink feedback information may completely or partially overlap with a sending resource of the data channel in time domain.

The sidelink feedback information may include at least one of the following information: the receiving response, the channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

When the method performed by a second communications apparatus is performed, the transceiver 601 may be configured to receive a reference signal from a first communications apparatus, where the reference signal carries the sidelink feedback information. The processor 603 may be configured to determine the sidelink feedback information based on the reference signal.

The reference signal may carry some or all of the sidelink feedback information.

For example, when the reference signal carries the sidelink feedback information, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal, an RB number of the reference signal, a type of the reference signal, or a type of a channel to which the reference signal belongs.

The reference signal may be a reference signal on a control channel, or the reference signal may be a reference signal on a data channel.

The transceiver 601 may be further configured to receive indication information from the first communications apparatus, where the indication information is used to indicate that the reference signal carries the sidelink feedback information; the indication information may be used to indicate a type of the sidelink feedback information carried by using the reference signal; the indication information may be used to indicate that the sidelink feedback information is carried by using the reference signal; or if the reference signal is the reference signal on the data channel, the indication information may be used to indicate that the sidelink feedback information is carried by using the data channel and the reference signal.

For example, a sending resource allocated to the sidelink feedback information may completely or partially overlap with a sending resource of the control channel in time domain. Alternatively, a sending resource allocated to the sidelink feedback information may completely or partially overlap with a sending resource of the data channel in time domain.

The sidelink feedback information may include at least one of the following information: a receiving response, channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

In addition, when the method performed by a first communications apparatus is performed, the processor 603 may be further configured to determine that a second condition is met; and the transceiver 601 may be configured to send sidelink feedback information on a first channel, where the second condition may include at least one of the following conditions: the first symbol occupied by the first channel is not later than sending timing for sending the sidelink feedback information; the last symbol occupied by the first channel is not later than sending timing for sending the sidelink feedback information; the first symbol occupied by the first channel is not earlier than a preparation time for sending the sidelink feedback information; or the last symbol occupied by the first channel is not earlier than a preparation time for sending the sidelink feedback information.

For example, a sending resource allocated to the sidelink feedback information may completely or partially overlap with a sending resource of the first channel in time domain.

The first channel may include at least one of the following: a sidelink control channel PSCCH, a sidelink data channel PSSCH, an uplink control channel PUCCH, or an uplink data channel PUSCH.

If a control channel and a data channel are multiplexed in a time division multiplexing TDM manner, the first channel may be a control channel. Alternatively, if a control channel and a data channel are multiplexed in an embedded manner, the first channel may be a control channel. Alternatively, if a control channel and a data channel are multiplexed in a frequency division multiplexing FDM manner, the first channel may be a data channel.

The sidelink feedback information may include at least one of the following information: a receiving response, channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

When the method performed by a second communications apparatus is performed, the transceiver 601 may be further configured to receive sidelink feedback information from a first communications apparatus through a first channel, where the first channel is at least one of the following: a sidelink feedback channel PSFCH, a sidelink control channel PSCCH, a sidelink data channel PSSCH, an uplink control channel PUCCH, or an uplink data channel PUSCH.

For example, a sending resource allocated to the sidelink feedback information may completely or partially overlap with a sending resource of the first channel in time domain.

The first channel may be at least one of the following: a sidelink feedback channel PSFCH, a sidelink control channel PSCCH, a sidelink data channel PSSCH, an uplink control channel PUCCH, or an uplink data channel PUSCH.

If a control channel and a data channel are multiplexed in a time division multiplexing TDM manner, the first channel may be a control channel. Alternatively, if a control channel and a data channel are multiplexed in an embedded manner, the first channel may be a control channel. Alternatively, if a control channel and a data channel are multiplexed in a frequency division multiplexing FDM manner, the first channel may be a data channel.

The sidelink feedback information may include at least one of the following information: a receiving response, channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

Figure 7:
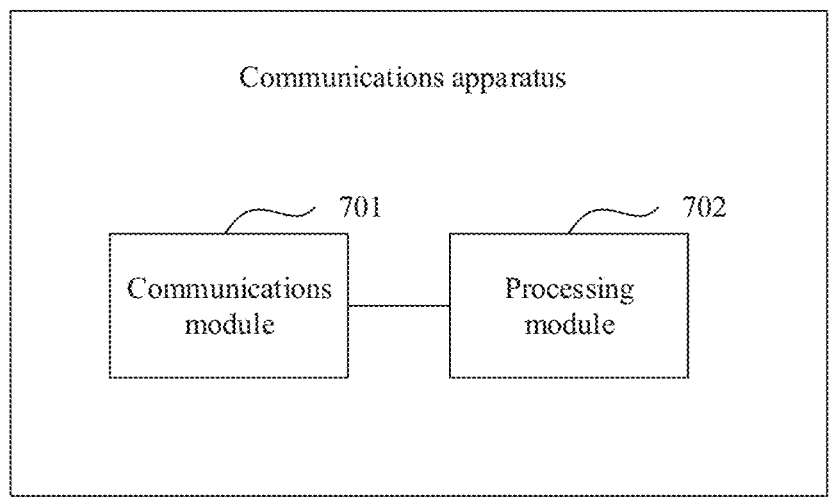
FIG. 7 shows a structure of another communications apparatus according to this application.

As shown in FIG. 7, an embodiment of this application further provides another communications apparatus. The communications apparatus may include a processing module 702 and a communications module 701 that are coupled to each other. Functions of the processing module 702 and the communications module 701 may be implemented by hardware, software, or hardware executing corresponding software.

When the method performed by a first communications apparatus is performed, the processing module 702 may be configured to determine sidelink feedback information. The communications module 701 may be configured to send a reference signal to a second communications apparatus, where the reference signal carries the sidelink feedback information.

The reference signal may carry some or all of the sidelink feedback information.

When the reference signal carries the sidelink feedback information, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal, an RB number of the reference signal, a type of the reference signal, or a type of a channel to which the reference signal belongs.

The communications module 701 may be specifically configured to send the reference signal to the second communications apparatus if it is determined that at least one of the following conditions is met: the sidelink feedback information includes a receiving response; the sidelink feedback information does not include channel state information; a length of the sidelink feedback information is not greater than a first length; the reference signal is a reference signal on a physical sidelink control channel PSCCH; the reference signal is a reference signal on a physical uplink control channel PUCCH; the reference signal is a reference signal on a physical sidelink shared channel PSSCH; the reference signal is a reference signal on a physical uplink shared channel PUSCH; the first symbol occupied by the reference signal is not later than sending timing for sending the sidelink feedback information; the last symbol occupied by the reference signal is not later than sending timing for sending the sidelink feedback information; the first symbol occupied by the reference signal is not earlier than a preparation time for sending the sidelink feedback information; or the last symbol occupied by the reference signal is not earlier than a preparation time for sending the sidelink feedback information.

The reference signal may be a reference signal on a control channel, or the reference signal may be a reference signal on a data channel.

The communications module 701 may be further configured to send indication information to the second communications apparatus, where the indication information is used to indicate a type of the sidelink feedback information carried by using the reference signal; the indication information is used to indicate that the sidelink feedback information is carried by using the reference signal; or if the reference signal is the reference signal on the data channel, the indication information is used to indicate that the sidelink feedback information is carried by using the data channel and the reference signal.

For example, a sending resource allocated to the sidelink feedback information may completely or partially overlap with a sending resource of the control channel in time domain. Alternatively, a sending resource allocated to the sidelink feedback information may completely or partially overlap with a sending resource of the data channel in time domain.

The sidelink feedback information may include at least one of the following information: the receiving response, the channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

When the method performed by a second communications apparatus is performed, the communications module 701 may be configured to receive a reference signal from a first communications apparatus, where the reference signal carries the sidelink feedback information. The processing module 702 may be configured to determine the sidelink feedback information based on the reference signal.

The reference signal may carry some or all of the sidelink feedback information.

For example, when the reference signal carries the sidelink feedback information, the reference signal may carry the sidelink feedback information by using at least one of the following parameters of the reference signal: a root sequence of the reference signal, a cyclic shift CS of the reference signal, an orthogonal cover code OCC of the reference signal, a comb of the reference signal, a symbol number of the reference signal, a quantity of symbols of the reference signal, a slot number of the reference signal, a quantity of slots of the reference signal, bandwidth of the reference signal, an RB number of the reference signal, a type of the reference signal, or a type of a channel to which the reference signal belongs.

The reference signal may be a reference signal on a control channel, or the reference signal may be a reference signal on a data channel.

The communications module 701 may be further configured to receive indication information from the first communications apparatus, where the indication information may be used to indicate a type of the sidelink feedback information carried by using the reference signal; the indication information may be used to indicate that the sidelink feedback information is carried by using the reference signal; or if the reference signal is the reference signal on the data channel, the indication information may be used to indicate that the sidelink feedback information is carried by using the data channel and the reference signal.

For example, a sending resource allocated to the sidelink feedback information may completely or partially overlap with a sending resource of the control channel in time domain. Alternatively, a sending resource allocated to the sidelink feedback information may completely or partially overlap with a sending resource of the data channel in time domain.

The sidelink feedback information may include at least one of the following information: a receiving response, channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

In addition, when the method performed by a first communications apparatus is performed, the processing module 702 may be further configured to determine that a second condition is met; and the communications module 701 may be configured to send sidelink feedback information on a first channel, where the second condition may include at least one of the following conditions: the first symbol occupied by the first channel is not later than sending timing for sending the sidelink feedback information; the last symbol occupied by the first channel is not later than sending timing for sending the sidelink feedback information; the first symbol occupied by the first channel is not earlier than a preparation time for sending the sidelink feedback information; or the last symbol occupied by the first channel is not earlier than a preparation time for sending the sidelink feedback information.

For example, a sending resource allocated to the sidelink feedback information may completely or partially overlap with a sending resource of the first channel in time domain.

The first channel may include at least one of the following: a sidelink control channel PSCCH, a sidelink data channel PSSCH, an uplink control channel PUCCH, or an uplink data channel PUSCH.

If a control channel and a data channel are multiplexed in a time division multiplexing TDM manner, the first channel may be a control channel. Alternatively, if a control channel and a data channel are multiplexed in an embedded manner, the first channel may be a control channel. Alternatively, if a control channel and a data channel are multiplexed in a frequency division multiplexing FDM manner, the first channel may be a data channel.

The sidelink feedback information may include at least one of the following information: a receiving response, channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

When the method performed by a second communications apparatus is performed, the communications module 701 may be further configured to receive sidelink feedback information from a first communications apparatus through a first channel, where the first channel is at least one of the following: a sidelink feedback channel PSFCH, a sidelink control channel PSCCH, a sidelink data channel PSSCH, an uplink control channel PUCCH, or an uplink data channel PUSCH.

For example, a sending resource allocated to the sidelink feedback information may completely or partially overlap with a sending resource of the first channel in time domain.

The first channel may be at least one of the following: a sidelink feedback channel PSFCH, a sidelink control channel PSCCH, a sidelink data channel PSSCH, an uplink control channel PUCCH, or an uplink data channel PUSCH.

If a control channel and a data channel are multiplexed in a time division multiplexing TDM manner, the first channel may be a control channel. Alternatively, if a control channel and a data channel are multiplexed in an embedded manner, the first channel may be a control channel. Alternatively, if a control channel and a data channel are multiplexed in a frequency division multiplexing FDM manner, the first channel may be a data channel.

The sidelink feedback information may include at least one of the following information: a receiving response, channel state information, or a scheduling request.

The channel state information may include but is not limited to at least one of a channel quality indicator, a precoding matrix indicator, a rank indicator, reference signal received power, reference signal received quality, a path loss, a sounding reference signal resource indicator, a channel state information reference signal resource indicator, a received signal strength indicator, a precoding type indicator, a moving direction of a vehicle, and an interference condition.

The receiving response may include but is not limited to at least one of an ACK, a NACK, or DTX.

It should be understood that the communications apparatus shown in FIG. 6 or FIG. 7 may be specifically a terminal apparatus, or may be a chip or a chip system applied to a terminal apparatus.

All or some of the foregoing embodiments may be implemented by using software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the computer instructions or the computer programs are loaded or executed on a computer, the procedures or functions according to the embodiments of this application are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

The embodiments of the present invention are described with reference to the flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may alternatively be stored in a computer readable memory that can indicate the computer or the another programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to the embodiments of the present invention without departing from the spirit and scope of this application. This application is intended to cover these modifications and variations of the embodiments of the present invention provided that these modifications and variations fall within the scope of the following claims of this application and their equivalent technologies.

What is claimed is:

1. A feedback information sending method comprising:
   determining, by a first communications apparatus, sidelink feedback information; and
   sending, by the first communications apparatus, a reference signal to a second communications apparatus, wherein the reference signal carries the sidelink feedback information, and the reference signal is a reference signal on a control channel, or the reference signal is a reference signal on a data channel.

2. The method according to claim 1, wherein the reference signal carries some or all of the sidelink feedback information.

3. The method according to claim 1, wherein the reference signal carries the sidelink feedback information by using at least one of the following parameters:
   a root sequence of the reference signal,
   a cyclic shift (CS) of the reference signal,
   an orthogonal cover code (OCC) of the reference signal,
   a comb of the reference signal,
   a symbol number of the reference signal,
   a quantity of symbols of the reference signal,
   a slot number of the reference signal,
   a quantity of slots of the reference signal,
   bandwidth of the reference signal,
   a resource block (RB) number of the reference signal, a type of the reference signal, or a type of a channel to which the reference signal belongs.

4. The method according to claim 1, wherein sending the reference signal to the second communications apparatus comprises:
sending, by the first communications apparatus, the reference signal to the second communications apparatus in response to at least one of the following conditions being met:
the sidelink feedback information comprises a receiving response;
the sidelink feedback information does not comprise channel state information;
a length of the sidelink feedback information is not greater than a first length;
the reference signal is a reference signal on a physical sidelink control channel (PSCCH);
the reference signal is a reference signal on a physical uplink control channel (PUCCH);
the reference signal is a reference signal on a physical sidelink shared channel (PSSCH);
the reference signal is a reference signal on a physical uplink shared channel (PUSCH);
a first symbol occupied by the reference signal is not later than sending timing for sending the sidelink feedback information;
a last symbol occupied by the reference signal is not later than sending timing for sending the sidelink feedback information;
the first symbol occupied by the reference signal is not earlier than a preparation time for sending the sidelink feedback information; or
the last symbol occupied by the reference signal is not earlier than a preparation time for sending the sidelink feedback information.

5. The method according to claim 1, further comprising:
sending, by the first communications apparatus, indication information to the second communications apparatus, wherein:
the indication information indicates a type of the sidelink feedback information carried by using the reference signal;
the indication information indicates that the sidelink feedback information is carried by using the reference signal; or
in response to the reference signal being the reference signal on the data channel, the indication information indicates that the sidelink feedback information is carried by using the data channel and the reference signal.

6. The method according to claim 1, wherein:
a sending resource allocated to the sidelink feedback information completely or partially overlaps with a sending resource of the control channel in time domain; or
a sending resource allocated to the sidelink feedback information completely or partially overlaps with a sending resource of the data channel in time domain.

7. The method according to claim 1, wherein the sidelink feedback information comprises at least one of the following:
the receiving response,
the channel state information, or
a scheduling request.

8. The method according to claim 7, wherein the receiving response comprises an acknowledgement, a negative acknowledgement, or discontinuous transmission.

9. The method according to claim 7, wherein the channel state information comprises at least one of the following: a channel quality indicator (CQI), a precoding matrix indicator (PMI), a rank indicator (RI), reference signal received power (RSRP), reference signal received quality (RSRQ), a path loss, a sounding reference signal (SRS) resource indicator (SRI), a channel state information reference signal (CSI-RS) resource indicator (CRI), a received signal strength indicator (RSSI), a precoding type indicator (PTI), a moving direction of a vehicle, or an interference condition.

10. A feedback information sending method comprising:
receiving, by a second communications apparatus, a reference signal from a first communications apparatus, wherein the reference signal carries the sidelink feedback information; and
determining, by the second communications apparatus, the sidelink feedback information based on the reference signal, wherein the reference signal is a reference signal on a control channel, or the reference signal is a reference signal on a data channel.

11. The method according to claim 10, wherein the reference signal carries some or all of the sidelink feedback information.

12. The method according to claim 10, wherein the reference signal carries the sidelink feedback information by using at least one of the following parameters:
a root sequence of the reference signal,
a cyclic shift (CS) of the reference signal,
an orthogonal cover code (OCC) of the reference signal,
a comb of the reference signal,
a symbol number of the reference signal,
a quantity of symbols of the reference signal,
a slot number of the reference signal,
a quantity of slots of the reference signal,
bandwidth of the reference signal,
a resource block (RB) number of the reference signal,
a type of the reference signal, or
a type of a channel to which the reference signal belongs.

13. The method according to claim 10, further comprising:
receiving, by the second communications apparatus, indication information from the first communications apparatus, wherein:
the indication information indicates a type of the sidelink feedback information carried by using the reference signal;
the indication information indicates that the sidelink feedback information is carried by using the reference signal; or
in response to the reference signal being the reference signal on the data channel, the indication information indicates that the sidelink feedback information is carried by using the data channel and the reference signal.

14. The method according to claim 10, wherein:
a sending resource allocated to the sidelink feedback information completely or partially overlaps with a sending resource of the control channel in time domain; or
a sending resource allocated to the sidelink feedback information completely or partially overlaps with a sending resource of the data channel in time domain.

15. The method according to claim 10, wherein the sidelink feedback information comprises at least one of the following:

a receiving response,
channel state information, or
a scheduling request.

16. The method according to claim 15, wherein the receiving response comprises an acknowledgement, a negative acknowledgement, or discontinuous transmission.

17. The method according to claim 15, wherein the channel state information comprises at least one of the following: a channel quality indicator (CQI), a precoding matrix indicator (PMI), a rank indicator (RI), reference signal received power (RSRP), reference signal received quality (RSRQ), a path loss, a sounding reference signal (SRS) resource indicator (SRI), a channel state information reference signal (CSI-RS) resource indicator (CRI), a received signal strength indicator (RSSI), a precoding type indicator (PTI), a moving direction of a vehicle, or an interference condition.

18. A feedback information sending method comprising:
determining, by a first communications apparatus, sidelink feedback information; and
sending, by the first communications apparatus, a reference signal to a second communications apparatus, wherein the reference signal carries the sidelink feedback information, and the reference signal is a reference signal on a control channel, or the reference signal is a reference signal on a data channel;
determining, by the first communications apparatus, that a second condition is met;
sending, by the first communications apparatus, the reference signal to the second communications apparatus in response to at least one of the following conditions being met:
a first symbol occupied by the first channel is not later than sending timing for sending the sidelink feedback information;
a last symbol occupied by the first channel is not later than sending timing for sending the sidelink feedback information;
the first symbol occupied by the first channel is not earlier than a preparation time for sending the sidelink feedback information; or
the last symbol occupied by the first channel is not earlier than a preparation time for sending the sidelink feedback information.

19. The method according to claim 18, wherein:
a sending resource allocated to the sidelink feedback information completely or partially overlaps with a sending resource of the first channel in time domain.

20. The method according to claim 18, wherein the sidelink feedback information comprises at least one of the following:
a receiving response,
channel state information, or
a scheduling request.

* * * * *